United States Defensive Publication [19] (H) [11] T103,703

Colquhoun et al. [43] Dec. 6, 1983

[54] PRODUCTION OF AROMATIC POLYKETONES

[76] Inventors: Howard M. Colquhoun, 25 Beeston Dr., Knutsford, Cheshire, England; David F. Lewis, 25 Landswood Park, Hartford, Northwich, Cheshire, England

[21] Appl. No.: 471,156

[22] Filed: Mar. 1, 1983

[30] Foreign Application Priority Data

Mar. 17, 1982 [GB] United Kingdom ..... 82 07783

[51] Int. Cl.[3] ..... C08G 16/00; C08G 67/00

[52] U.S. Cl. ..... 528/125; 528/126; 528/128; 528/172; 528/173; 528/176; 528/179; 528/206; 528/207

[57] ABSTRACT

A process for the production of a thermoplastic aromatic polyketone which process comprises reacting in the presence of a fluoroalkane sulphonic acid, preferably $CF_3SO_2OH$, the reactants selected from the following class:

(a) at least one aromatic monocarboxylic acid of the formula:

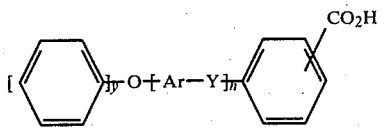

A where —Y— is a direct link, —O—, —S—, —NAr′— where Ar′ is a monovalent aromatic radical (preferably phenyl); Ar is a divalent aromatic radical but must not be —Ph—CO—Ph— or —Ph—$SO_2$—Ph— (where —Ph— is phenylene) when y is 1; and n is an integer of ≧1 and y is an integer of 1 to 3;

(b) a mixture of at least one aromatic dicarboxylic acid of the formula:

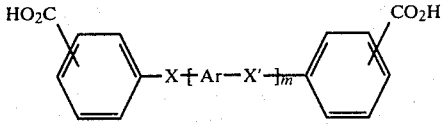

B where —X— and —X′— are independently a direct link —O—, —S—, —NAr′— where Ar′ is as defined in (a); m is 0 or an integer of ≧1; and Ar is as defined in (a); and at least one aromatic compound of formula:

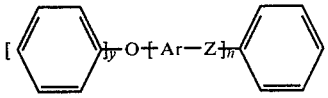

C where —Z— is —O— or a direct link; and Ar, n, and y are as defined in (a); and (c) a combination of (a) and (b).

The aromatic carboxylic acid is particular 4-(4-phenoxy)phenoxy benzoic acid which yield an aromatic polyketherketone having repeat units of the formula

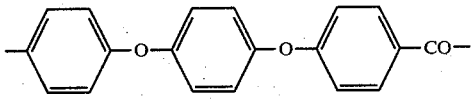

16 Claims, No Sheets Drawing,

21 Pages Specification

The file of this unexamined application may be inspected and copies thereof may be purchased (849 O.G. 1221, Apr. 9, 1968).